Feb. 17, 1959  F. E. GERBER  2,873,817
BALL BEARING LUBRICATOR
Filed Dec. 17, 1956

Frederick E. Gerber
INVENTOR.

BY
Attorneys

United States Patent Office 2,873,817
Patented Feb. 17, 1959

2,873,817
BALL BEARING LUBRICATOR

Frederick E. Gerber, Falls Church, Va., assignor of ten percent to Carlton A. Keys, Springfield, Va.

Application December 17, 1956, Serial No. 628,877

1 Claim. (Cl. 184—1)

(Granted under Title 35, U. S. Code (1952), sec. 266)

The invention described herein may be manufactured and used by or for the Government of the United States for governmental purposes without the payment to me of any royalty thereon, in accordance with the provisions of 35 United States Code (1952) Section 266.

The present invention relates to new and useful improvements in lubricators for various sizes of ball bearings of either the sealed, shielded or open type and has for its primary object to provide, in a manner as hereinafter set forth, novel means for expeditiously and positively packing the ball cavities of such bearings with new or fresh grease, at the same time ejecting the old grease and any dirt, etc., that may be therein.

Another very important object of the invention is to provide a lubricator of the character described comprising a holder including unique means for firmly clamping the bearing assembly to be packed.

Other objects of the invention are to provide a ball bearing lubricator or packer of the aforementioned character which will be comparatively simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
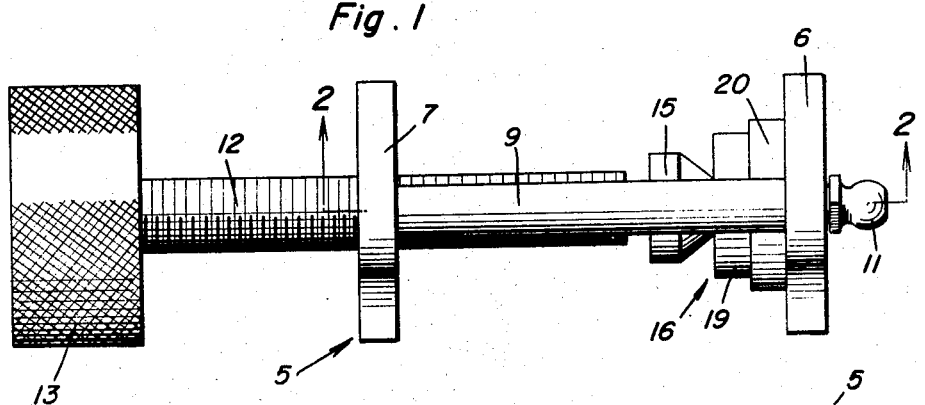
Figure 1 is a plan view of a ball bearing lubricator constructed in accordance with the present invention.

Referring now to the drawing in detail, it will be seen that the embodiment of the invention which has been illustrated comprises a frame of suitable metal, preferably cold rolled steel, which is designated generally by reference character 5. The frame 5, which may also be of any desired dimensions, includes a pair of opposed plates comprising a platen 6 and clamping plate 7 mounted on the reduced end portions 8 of a pair of parallel spacing rods 9.

The platen 6 includes a polished inner work engaging face 10. Threadedly mounted within an orifice centrally in the platen 6 is a conventional lubricant pressure fitting 11.

Threadedly mounted in the clamping plate 7 is a clamping screw 12. The screw 12 is provided on one end with a knurled turning knob 13. At its inner or forward end, the screw 12 terminates in a reduced, smooth, rounded tip 14. Loosely mounted on the tip 14 is a conical head 15.

Reference character 16 designates generally a conventional bearing assembly or unit. The assembly 16 comprises the usual balls 17 mounted between inner and outer races 18 and 19, respectively.

In the embodiment shown, an adapter ring 20 is provided on the plate 6 for the bearing assembly 16. One end portion of the adapter ring 20 is internally rabbeted or counterbored in a manner to provide a seat 21 for the outer race 19 of the assembly 16.

Figure 2:
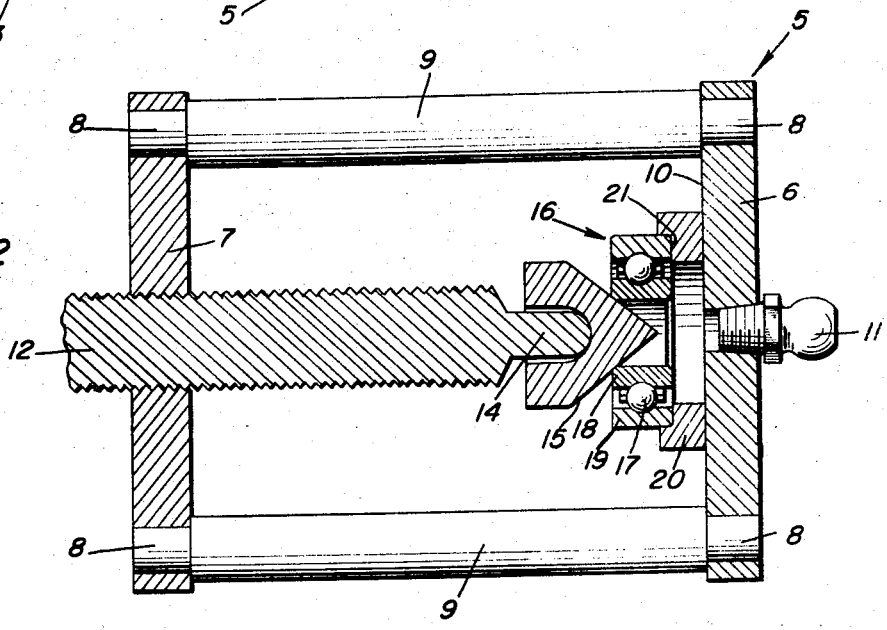
Figure 2 is an enlarged view in longitudinal section, taken substantially on the line 2—2 of Figure 1.
Figure 3:
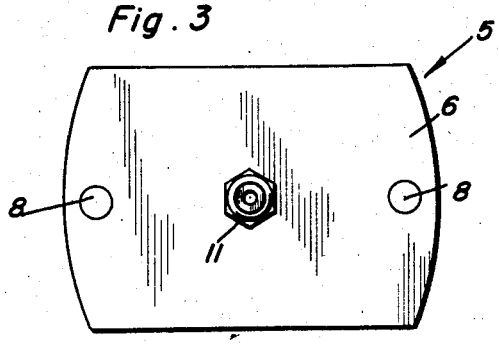
Figure 3 is a view in end elevation of the device.
Figure 4:
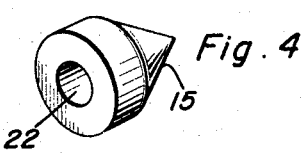
Figure 4 is a detail view in perspective of the self-aligning conical head.

It is thought that the use of the device will be readily apparent from a consideration of the foregoing. Briefly, the bearing assembly 16 to be packed is mounted on the platen 6 with the adapter ring 20 therebetween and the conical head 15, mounted on the screw 12, is engaged in the bore of the inner race 18 of said assembly. The screw 12 is then tightened to ensure sealed joints between the members 15 and 18, the members 19 and 20 and between said member 20 and the plate 6. It will be apparent from Fig. 2 that a sealed chamber is thereby formed, communicating with the raceway and bore of the bearing and connecting with the orifice and pressure fitting 11. The conical head 15, being loosely mounted on the rounded tip 14 of the screw 12, is self-aligning. The chuck or nozzle of a grease gun is then applied in the usual manner to the fitting 11 for injecting grease under pressure into the assembly 16 and the adapter ring 20. The grease is thus forced between and completely fills the space between the races 18 and 19, ejecting the old grease and dirt or other foreign matter. When the inner race 18 of the bearing assembly is of less thickness than the outer race 19, the adapter ring 20 may be dispensed with. Thus, the relatively wide outer race of the bearing to be packed is seated directly on the polished face 10 of the plate 6. The construction and arrangement of the device is such that it will readily accommodate various sizes of bearings within a given range. A single adapter ring will accommodate several different sizes of bearings. However, various sizes of adapter rings may be used. A socket 22 in the conical head 15 accommodates the tip 14 of the screw 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A device for lubricating anti-friction bearings of the type having inner and outer races and a central bore comprising a platen, movably mounted means on said platen for sealing the peripheral margin of the outer race of the bearing and forming a chamber communicating with the raceway and bore of said bearing, said platen including an orifice containing a lubricant pressure fitting connecting with said chamber, spacing rods inserted in and extending substantially normal to the plane of said platen, a clamping plate mounted on said rods in spaced relation to said platen, a clamping screw threadingly mounted in said clamping plate, said clamping screw having a rounded end, and a conical centering plug freely carried by the rounded end of said clamping screw so that the apex of said plug is adapted to seat within the bore portion of said bearing to seal an end of said chamber.

References Cited in the file of this patent

UNITED STATES PATENTS

| 132,351 | Brown | Oct. 22, 1872 |
| 1,280,296 | Pruyn | Oct. 1, 1918 |
| 2,137,660 | Welke | Nov. 22, 1938 |
| 2,210,478 | Berg | Aug. 6, 1940 |
| 2,369,178 | Richmond | Feb. 13, 1945 |
| 2,615,532 | Drury | Oct. 28, 1952 |
| 2,649,123 | Gulland | Aug. 18, 1953 |
| 2,707,528 | Mulvanity | May 3, 1955 |